United States Patent
Vaysman

(10) Patent No.: US 10,467,619 B2
(45) Date of Patent: Nov. 5, 2019

(54) METHOD AND SYSTEM FOR CONTACTLESS PAYMENTS

(71) Applicant: Aintu Inc., San Jose, CA (US)

(72) Inventor: Arthur Vaysman, San Jose, CA (US)

(73) Assignee: AINTU INC, San Jose, CA (US)

( * ) Notice: Subject to any disclaimer, the term of this patent is extended or adjusted under 35 U.S.C. 154(b) by 323 days.

(21) Appl. No.: 15/430,423

(22) Filed: Feb. 10, 2017

(65) Prior Publication Data

US 2017/0228720 A1    Aug. 10, 2017

Related U.S. Application Data

(60) Provisional application No. 62/293,418, filed on Feb. 10, 2016.

(51) Int. Cl.
| | |
|---|---|
| G06K 19/06 | (2006.01) |
| G06Q 20/32 | (2012.01) |
| G06F 3/16 | (2006.01) |
| G06Q 20/20 | (2012.01) |
| G06Q 20/38 | (2012.01) |
| G06Q 20/40 | (2012.01) |
| G10L 19/00 | (2013.01) |
| G10L 25/48 | (2013.01) |

(52) U.S. Cl.
CPC .......... G06Q 20/3272 (2013.01); G06F 3/16 (2013.01); G06Q 20/20 (2013.01); G06Q 20/38215 (2013.01); G06Q 20/4012 (2013.01); G10L 19/00 (2013.01); G10L 25/48 (2013.01); G06Q 2220/00 (2013.01)

(58) Field of Classification Search
CPC ............... G06Q 20/3272; G06Q 20/20; G06Q 20/38215; G06Q 20/4012; G06Q 2220/00; G06F 3/16; G10L 19/00; G10L 25/48
USPC ............... 235/492, 487, 379; 705/67, 16, 71
See application file for complete search history.

(56) References Cited

U.S. PATENT DOCUMENTS

| | | | |
|---|---|---|---|
| 9,082,413 B2 | 7/2015 | Herring et al. | |
| 2011/0258121 A1* | 10/2011 | Kauniskangas | G06Q 20/20 705/67 |
| 2013/0246199 A1* | 9/2013 | Carlson | G06Q 20/20 705/16 |
| 2014/0101043 A1 | 4/2014 | Cincera | |
| 2014/0244514 A1* | 8/2014 | Rodriguez | G06Q 20/10 705/71 |

FOREIGN PATENT DOCUMENTS

| | | |
|---|---|---|
| WO | 2014059520 A1 | 4/2014 |
| WO | 2015176019 A1 | 11/2015 |

* cited by examiner

*Primary Examiner* — Karl D Frech
(74) *Attorney, Agent, or Firm* — HM Law Group LLP; Vani Moodley

(57) ABSTRACT

A method for contactless payment is disclosed. The method comprises, at a point of sale, initiating payment by transmitting a token from a first device to a second device using a speaker associated with a first device, and a microphone associated with the second device; transmitting the token from the second device to a payment server; authenticating the token by the payment server; and upon successful authentication of the token, determining with a payment server whether the authorize of the payment.

11 Claims, 7 Drawing Sheets

METHOD AND SYSTEM FOR CONTACTLESS PAYMENTS

FIELD

Embodiments of the present invention relate to methods and systems for effecting payment for goods and services.

BACKGROUND OF THE INVENTION

There is a growing trend towards a cashless society where payments for goods and services takes place without the exchange of cash. Instead, payment occurs by initiating a transfer from one bank account to another via electronic means. For the most part cashless payments are effected by means of credit or debit cards that bear a magnetic stripe encoded with information that can be read by a card reader at the point-of-sale in order to complete a payment transaction. Increasingly, there is a trend towards contactless payment systems as exemplified by Apple Pay where a Near-Field Communication (NFC) device communicates with a mobile phone to facilitate payment. However, in the latter system specialized equipment is required in the form of NFC readers for the system to operate.

SUMMARY

Embodiments of the present invention disclose a method and system for effecting contactless payments, without the need to install specialized equipment at a point-of-sale.

Advantageously, a payor using a mobile phone may transmit an encoded message wirelessly to a receiving device of a payee. Advantageously, the encoded message is transmitted using a speaker of the mobile phone, and received using a microphone of the receiving payee device.

The code may be masked by other audio included in the transmission, for example music that may be appealing to a human. Thus, a human may interpret the transmission as a catchy jingle when in reality the transmission includes a one-time payment token that may be used by the receiving device in order to complete a payment transaction.

Significantly, the transmission may occur in a noisy environment, such as at a busy checkout counter, without any data loss or errors.

Moreover, apart from the devices used to transmit and receive the code, which may be in the form of a mobile phone, no specialized equipment is required to complete a payment transaction.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
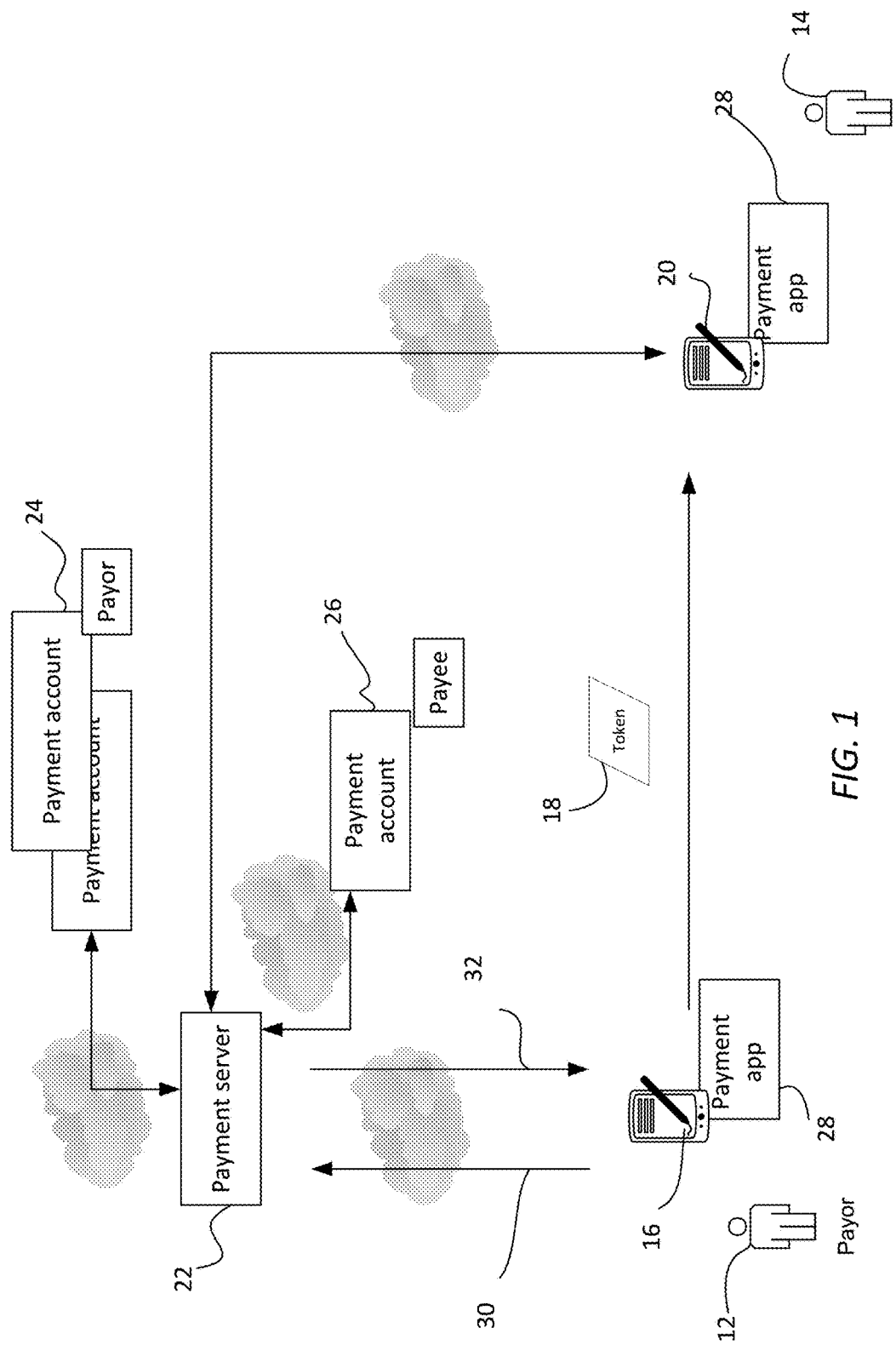
FIG. 1 shows a network environment for practicing embodiments of the present invention.

Broadly, embodiments of the present invention disclose techniques for contactless payments. Referring to FIG. 1 of the drawings, a payor 12 wishes to make payment to a payee 14. In this scenario, the payor 12 uses a mobile device 16 such as a smartphone to initiate the payment to the payee 14. As will be explained, the payment is effected by transmission of the payment token 18 to a receiving device 20 of the payee 14. Devices 16, 20 may comprise smart phones, tablet PCs, and the like.

In one embodiment, both payor 12 and payee 14 are registered with a payment server 22. The payment server 22 may be deployed as a cloud-based server and is configured to facilitate payments between a payor and payee, as will be described.

In one embodiment, in order to enable payments, payor 12, and the payee 14 are required to be registered with the payment server 22. Thus, the no payment server 22 may be configured to engage in a registration process in with each of payor 12, and payee 14. At the end of the registration process, each of payor 12, and payee 14 will have user accounts registered with the payment server 22, and login credentials whereby said user accounts may be accessed.

Figure 2:
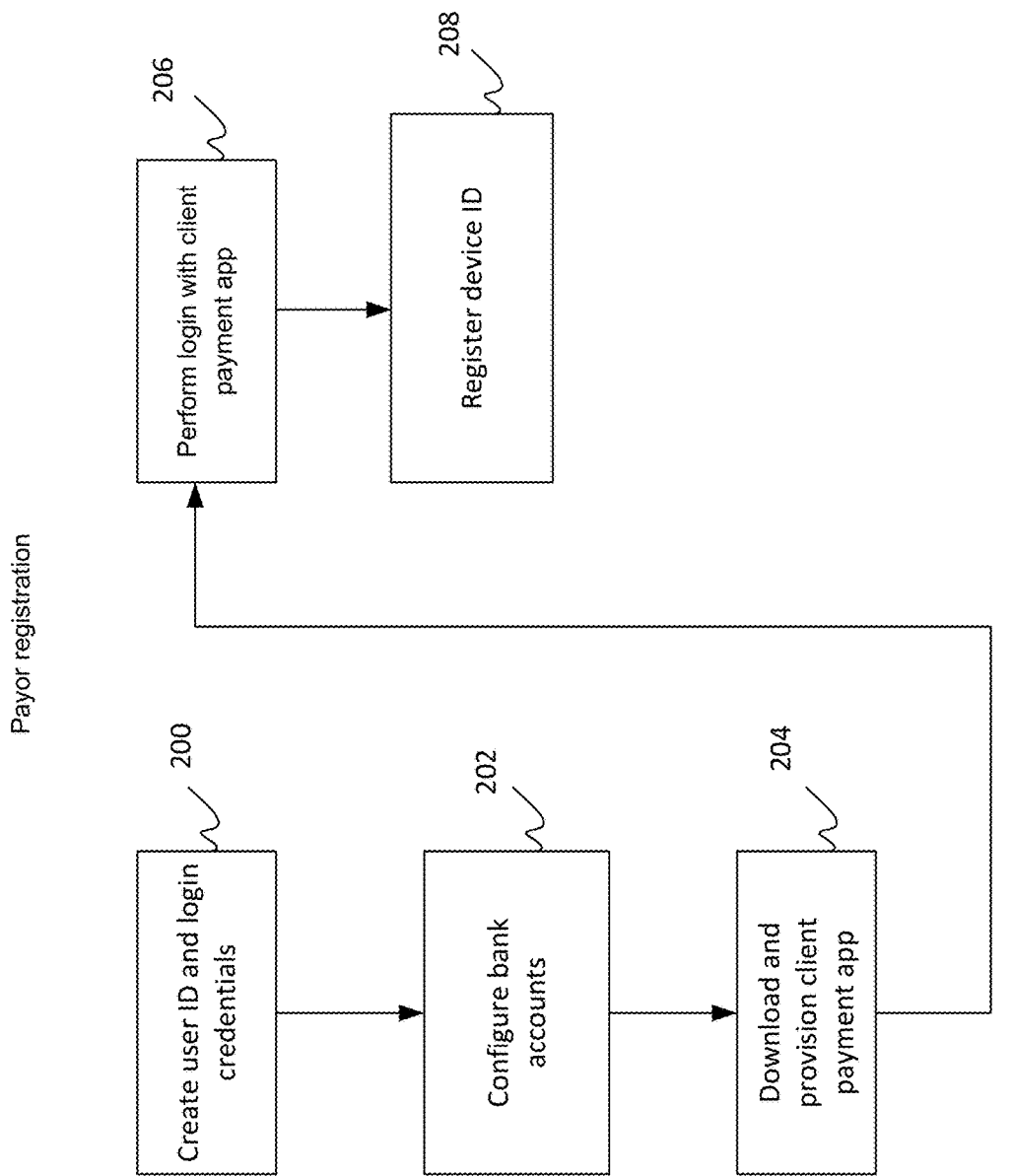
FIG. 2 illustrates the operations performed as part of the registration process, in accordance with one embodiment of the invention.

FIG. 2 illustrates the operations performed as part of the registration process, in accordance with one embodiment of the invention. Referring to FIG. 2, at block 200, the user (payor or payee) uses an interface provided by the payment server 22 create a user ID and login credentials. This step may be facilitated using a web browser communicatively coupled to the payment server 22. At block 202, the user configures bank accounts to be used in conjunction with the payment service. In this step, for example, the user may provide information associated with one or more bank accounts to facilitate, for example, ACH transfers into and out of said bank accounts. In one embodiment, for security purposes, small token amounts may be deposited into each bank account identified by a user, and the user may be required to validate the bank account by specifying the amount of the deposit to the payment server 22. If the amount deposited, and the amount of the deposit entered by the user do not match, then the particular bank account will not be registered/configured. On the other hand, if the amount deposited, and the amount of the deposit entered by the user do match, then the bank account will be registered/configured.

At block 204, the user downloads and provisions a client payment app 28. For example, the payor 12 may download the client payment app 28 to the mobile device 16, whereas the payee 14 may download the client payment app 28 to the device 20. As will be explained, the client payment app 28 provides functionality to facilitate payments between a payor and a payee. In some embodiments, if the payee 14 is a merchant than the version of the client payment app 28 installed in the device 20 may include additional and/or different functionality from the client payment of 28 installed on the device of the consumer payor 12.

A block 206, the user performs a login to the payment server 22 using the client payment app 28. As part of the login process, the device IDs associated with the devices 16, 20 are transmitted to the payment server 22. In response, the payment server 22 is configured to bind the particular device IDs to the user ID of the user as part of the step 208, wherein the device ID is registered to the user.

Referring to FIG. 1 of the drawings, it will be seen that the payor 12 has two payment accounts 24 registered with the payment server 22, whereas the payee has one payment account 26 registered with the payment server 22.

To begin the payment process, in one embodiment the payor 12 initiates a payment token request 30 to the payment server 20. The payment token request 30 is generated by the payment app 28.

In one embodiment, the payment server 22 is configured to receive the payment token request and to generate a one-time payment token in response thereto. The payment token may be a unique number from a number space that is large enough to prevent fraudsters from replicating the payment token. In one embodiment, the number space a large enough to accommodate a number that includes 18 trailing zeros. Additionally, the numbers from the number space may be randomly selected as one-time tokens. In other words, the one-time tokens are not serially generated, which reduces the possibility of a fraudster predicting a token.

The one-time payment token generated by the payment server 22 is transmitted to the client device 16, as indicated by the arrow 32. In one embodiment, upon receiving the one-time token from the payment server 22, the payment app 28 of the payor 12 transmits the token (indicated by reference 18) to the payee 14. More accurately, the one-time payment token 18 is transmitted to the mobile device 20 of the payee 14 that is provisioned with the payment app 28. In one embodiment, transmission of the payment token may be based on a novel encoding scheme for transmitting digital data over a short-range audio link. Advantageously, for the transmission commodity microphone and speaker hardware associated with a handheld mobile device may be used. Moreover, even under noisy conditions the digital data may transmitted and decoded.

The above scenario for obtaining a token to defendant on connectivity being available to the payment server 22. Therefore, this scenario is referred to as an online scenario. However, in an off-line scenario in which there is no connectivity to the payments of a 22, the transmitting payment app 28 may generate a token by itself independently of the payment server 22, for transmission to the receiving payment app 28, in the manner described. The token generated by the payment app 28 may include a user ID, the payment amount, the transaction location, a time stamp for the transaction, and one or more additional tokens. The information of the token advantageously, uniquely identifies the user making the payment, the device through which the payment is made, and the payment transaction thereby minimizing the possibility of fraud. To further minimize the possible to fraud, the payment app 28 may be configured to require the payor to unlock the payment functionality of the app by inputting a personal identification number. This is in addition to the user having unlocked his/her device for use in general.

In some embodiments, the token generated by the payment app 28 may also include typical information required in order to enable a credit card type transaction. This information may include a credit card number, and expiration date, and a verification code. Alternatively, the token generated by the payment app 28 may include sufficient admission to identify a bank account associated with the payor to allow the payment server 22 to process a payment authorization request associated with said bank account.

In one embodiment, the encoding scheme may be designed to spread signal energy over a wide frequency range to provide immunity against frequency-dependent channel fades. Simultaneously, the scheme may allow for complexity detection of incoming transmissions, as well as precise synchronization to the digital data stream encoded in the transmission.

In another embodiment, the encoding scheme may be designed to make maximum use of the limited dynamic range of the transmit speaker hardware by using square wave rather than sinusoidal signals.

To implement the encoding scheme, the usual elements of any communication system may be used such as a source encoder or compression engine, an error correction code, a checksum sequence, a digital to analog converter, transducer hardware to create sound waves from a voltage waveform on the transmitter side, and a sensor e.g. a microphone to detect air pressure variations from sound waves, an analog to digital converter, logic to detect and decode incoming data transmissions and to check the integrity of the transmission using the checksum.

The transmitted waveform may comprise a concatenation of two or more of the following distinct signals: a "start melody", "detection beacon", "preamble", "silence gaps", "data" and "end melody".

Each of these signals are intended to serve one distinct purpose: e.g. the start and end "melodies" are designed to bookend the rest of the transmission to make the overall audio pleasing or at least comfortable to the human ear. It may also have the effect of masking the transmission to potential eavesdropping devices.

In one embodiment, two or more separate signals may be generated to aid detection and synchronization. In conventional communications systems, a preamble sequence which has sharply peaked autocorrelation properties is used to accurately identify the start of incoming transmissions. However, detecting such a sequence requires the use of a linear filter matched to the preamble sequence which usually takes the form of an FIR filter with a long impulse response. This can be an expensive operation in terms of power, CPU and memory especially for receivers that need to continuously monitor for incoming transmissions. A device using the inventive encoding scheme may employ an additional signal that is easy to detect, but does not have a sharp correlation function to first detect a transmission and only then invoke the expensive filter that searches for the preamble.

The waveform used to modulate data may have a constant envelope or at least a small peak to average ratio (e.g. the peak to average power ratio may be 0.5). One example of such a signal is a "square chirp (SC)"; just like the common chirp signal, the SC is a quasi-periodic signal with a frequency that increases at a constant rate in time over a specified band. However, unlike the common (sinusoidal) chirp, the SC consists of square waves, which surprisingly makes better use of the peak transmit power capability of the speaker hardware. The use of square wave signals in SC does lead to higher frequency harmonics, but under peak power rather than battery constraints, thus the waste of power represented by these harmonics is irrelevant. In one embodiment, interference with other devices is not an important consideration because of the short range and short duration of the transmission.

Figure 3:
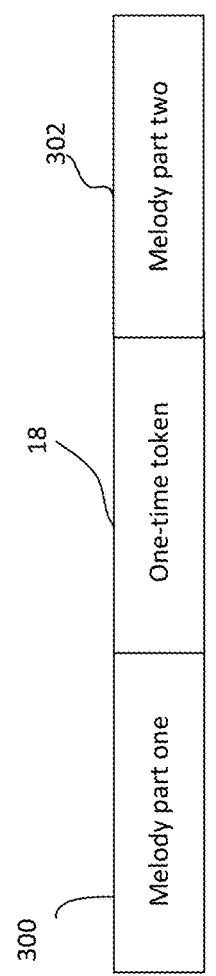
FIG. 3 shows a token sandwiched between two parts of a melody, in accordance with one embodiment of the invention.

In one embodiment, a one-time token 18 may be encoded for transmission by a carrier wave using a frequency modulation scheme such as Frequency-Shift Keying (FSK). Thus, the token 18 may be transmitted using discreet frequency changes of a carrier wave that is broadcast from the device 16 to the device 20. Unfortunately, said discreet frequency changes when heard by the human ear can be very unpleasant. Accordingly, in one embodiment, the code representing the token is sandwiched between two portions of the melody/tune, which are also encoded through frequency modulation for transmission by the carrier wave. This is shown in FIG. 3 of the drawings, where token 18 is sandwiched between a first part 300 of a melody and a second part 302 of said melody.

Figure 4:
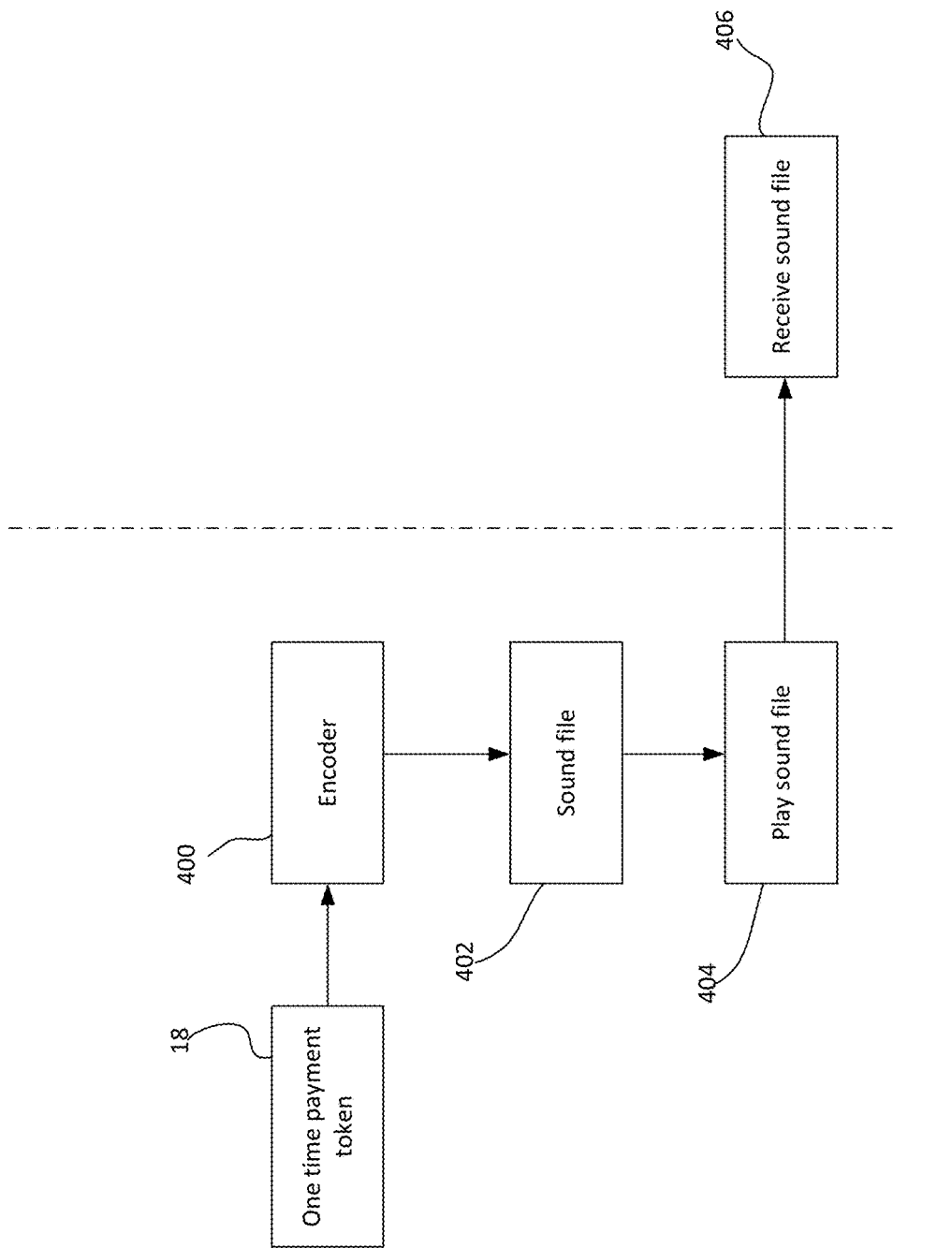
FIG. 4 illustrates a process for encoding a token in a sound file, in accordance with one embodiment of the invention.

Referring now to FIG. 4 of the drawings, in one embodiment, in order to generate a signal with a one-time token 18 sandwiched between two parts of the melody, the token 18 is input into an encoder 400. The encoder 400 is configured to implement encoding techniques, such as the FSK encoding technique described above. The encoder 400 encodes the one-time token 18 together with a melody or tune to produce a sound file 402 which includes two melody portions and a code representing the one-time token 18 sandwiched therebetween in similar fashion to what has been described above with reference to FIG. 3. The encoding and the generation of the sound file 402 is performed by the device 16.

In one embodiment, for transmission of the one-time token 18, the device 16 plays the sound file 402 at block 404. The sound file 402 is received by the device 20 at block 406 through a microphone associated with the device 20. Within the device 20, once the one-time token 18 of the sound file 402 has been received, decoding thereof begins. This process happens concurrently as the melody portions 300, 302 are played. In one embodiment, the melody portions 300, 302 may be of a sufficient length to enable the device 20 to completely decode the one-time token 18 so that when the melody portions 300, 302 end, the one-time token 18 is completely decoded. Thus, a perception of a fast decode is achieved. Moreover, playing of the melody portions masks the unpleasant sound associated with the transmission of the one-time code 18.

In one embodiment, the payment of 28 may allow the payor 12 to specify the payment account. In this case, the transmission to the device 20 may include the amount of the payment in addition to the one-time payment token 18. In some cases, the payment app 28 may be configured to transmit the payment amount to the payment server 22 is part of the payment authorization request 30.

Figure 5:
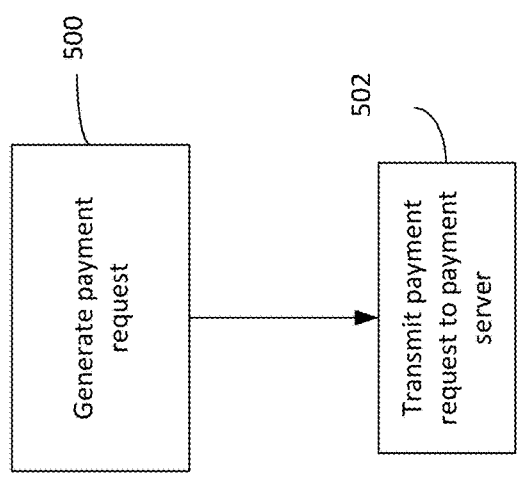
FIG. 5 illustrates the operations to generate a payment request, in accordance with one embodiment of the invention.

As noted above, the device 20 receives and decodes the transmission from the device 16 in order to recover the one-time payment token 18. Referring now to FIG. 5 of the drawings, operations performed by the device 20 in conjunction with the client payment app 28, in accordance with one embodiment of the invention, is shown. As will be seen, at block 500 a payment request is generated. The payment request includes the one-time payment token 18. Optionally, the payment request may also include a payment amount associated with the transaction. For example, if the payee 14 is a merchant or retailer then according to one use case, the payor 12 does not insert the payment amount, rather the merchant does this as part of a checkout process. In this case the payment request will then include the payment amount inserted by the merchant. At block 502, the device 20 transmits the payment request to the payment server 22.

Figure 6:
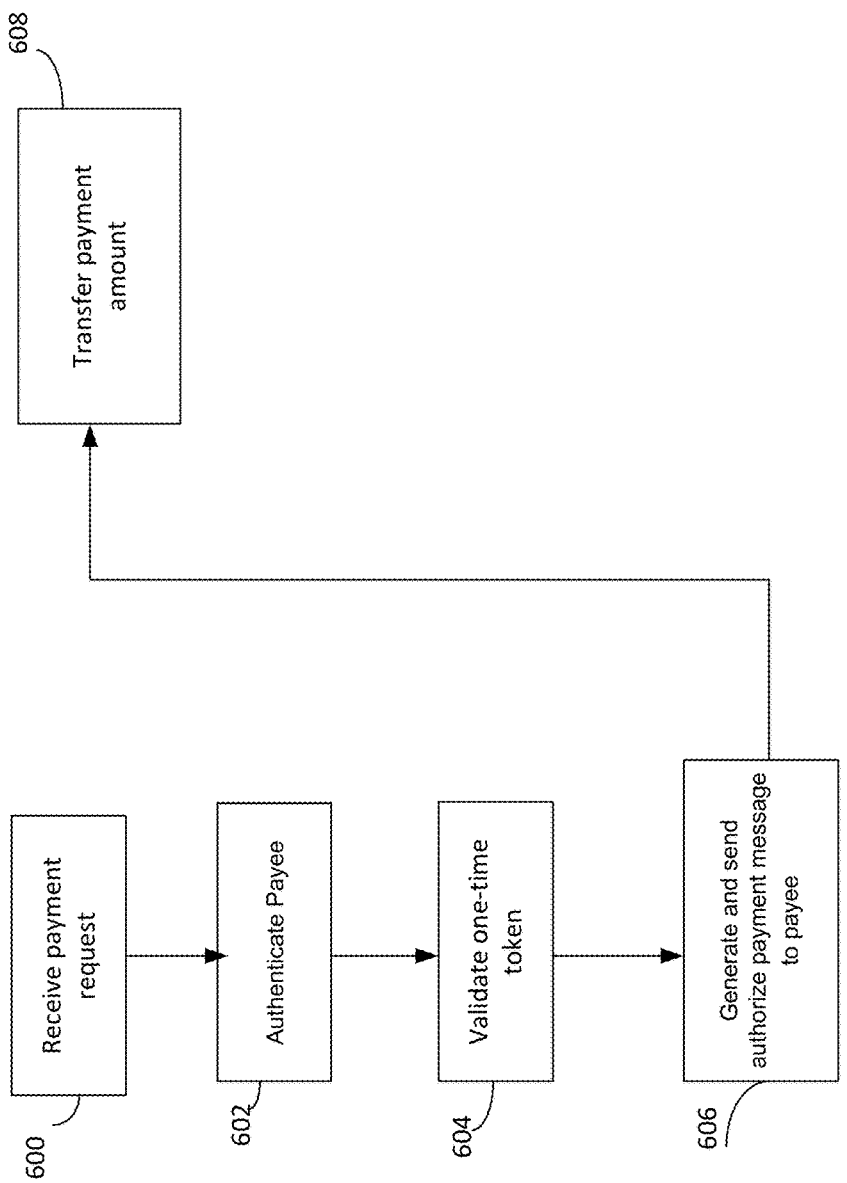
FIG. 6 illustrates the operations to process a payment request, in accordance with one embodiment of the invention.

Turning now to FIG. 6 of the drawings, the operations performed by the payment server 22, in accordance with one embodiment, to effect payment between the payor 12 in the payee 14, is shown. Referring to FIG. 6, at block 600 the payment server 22 receives the payment request from the device 20. At block 602, the payment server 22 authenticates the payee 14.

In one embodiment, authentication succeeds if the device ID included in the transmission from the device 20 matches the device ID of a registered device of the payee 14. If the payee 14 is authenticated, then at block 604 the one-time token included in the payment request is validated. In one embodiment, the one-time token passes validation only if it matches an open one-time token generated by the payment server 22. In one embodiment, an open one-time token may include any token generated by the payment server 22 in response to the pavement authorization request within a certain time, for example say was in the last five minutes, and which is not yet been transmitted back to the payment server 22 is part of a payment request.

At block 606, if the one-time token 18 is validated, then the payment server generates and sends a payment authorize message to the payee 12. In one embodiment, this message may include information specifying that the payor 14 is requesting the transaction amount to be paid. In one embodiment, the payee 12 transmits a payment authorize confirmation message back to the payment server 22. Once this message is received, the block 608 executes in order to transfer the payment amount to the payee 14. Transferring the payment amount may be achieved in various ways, in accordance with different embodiments. In one embodiment, the payment server 22 initiates a funds request from a payment account associated with the payor 12. In the case of the payor 12 having multiple payment accounts, and the payor 12 may be requested to specify the particular payment account as a source of payment funds. The funds request may be initiated via an ACH request. The payment server 22 in effect acts as a broker to transfer the payment amount from the payor's payment account to the payee's payment account. In this case, the payment server 22 implements functionality similar to PayPal, and other such payment providers. In some cases, the payment accounts of both the payor and the payee may actually be virtual payment accounts.

Figure 7:
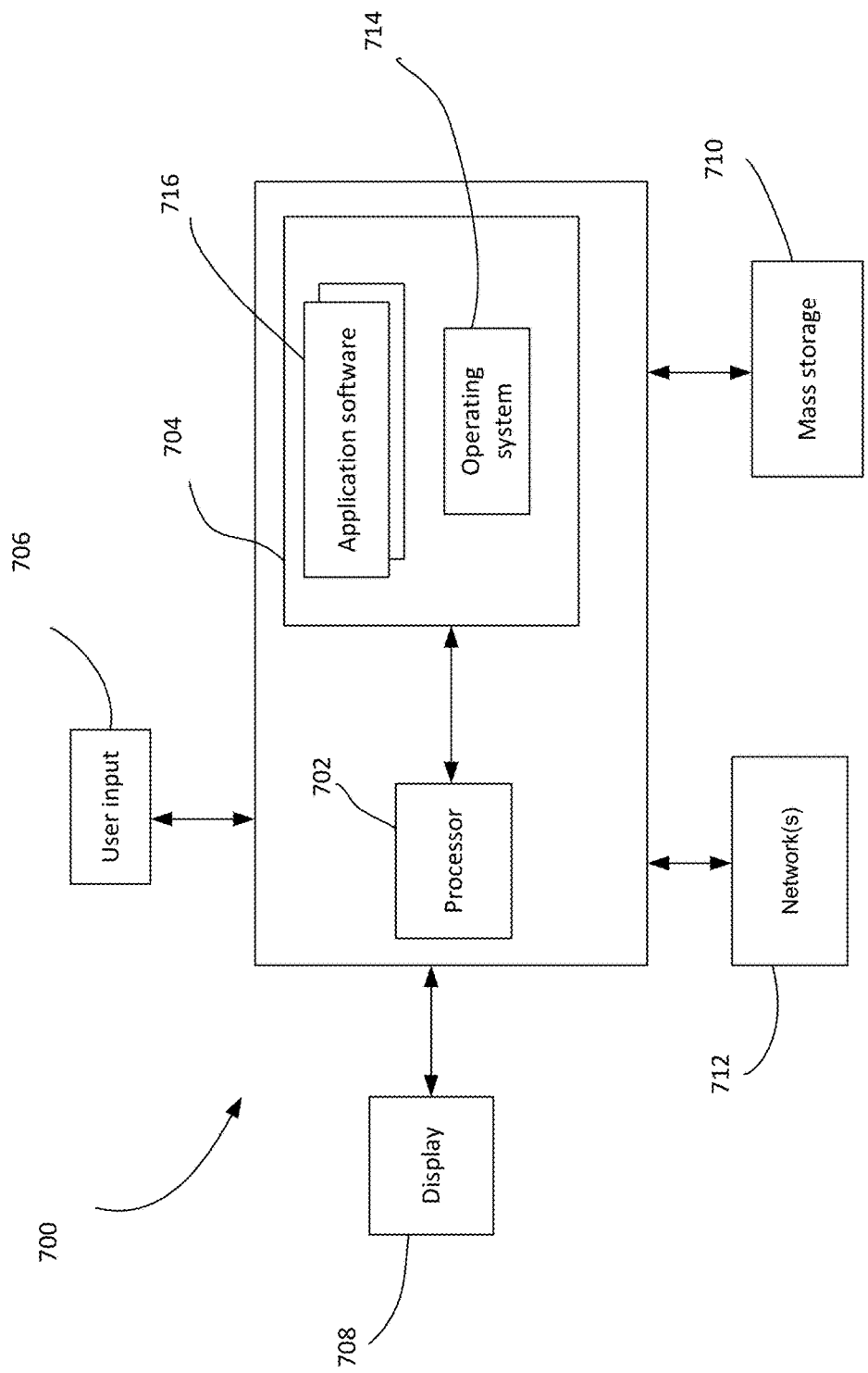
FIG. 7 illustrates hardware for implementing a payment server, in accordance with one embodiment of the invention.

FIG. 7 shows an example of hardware 700 that may be used to implement the payment server 22 in accordance with one embodiment. The hardware 700 may include at least one processor 702 coupled to a memory 704. The processor 702 may represent one or more processors (e.g., microprocessors), and the memory 704 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 704 may be considered to include memory storage physically located elsewhere in the hardware, e.g. any cache memory in the processor 702, as well as any storage capacity used as a virtual memory, e.g., as stored on a mass storage device.

The hardware also typically receives a number of inputs and outputs for communicating information externally. For interface with a user or operator, the hardware may include one or more user input output devices 706 (e.g., a keyboard, mouse, etc.) and a display 708. For additional storage, the hardware 700 may also include one or more mass storage devices 710, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 712 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 712 and each of the components, as is well known in the art.

The hardware 700 operates under the control of an operating system 714, and executes application software 716 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The invention claimed is:

1. A method for contactless payment, comprising:
   at a point of sale, initiating payment by transmitting a token, from a first device to a second device using a speaker associated with a first device, and a microphone associated with the second device, wherein the token is generated by the first device independently of a payment server;
   transmitting the token from the second device to the payment server;
   authenticating the token by the payment server; and
   upon successful authentication of the token, authorizing of the payment by the payment server.

2. The method of claim 1, further comprising registering the first device, and the second device as authorized devices for payment processing with the authentication server.

3. The method of claim 1, wherein in an online mode the first device engages in a transaction with the payment server in order to obtain the token prior to transmission.

4. The method of claim 3, wherein the token comprises a payment amount and identification information to uniquely identify aspects of the payment transaction.

5. The method of claim 4, wherein the identification information comprises information selected from the group consisting of a consumer ID, a payment amount, a transaction location, a time stamp, and a token.

6. The method of claim 1, wherein the token is encrypted by the first device prior to transmission.

7. The method of claim 1, wherein the token is encoded with a melody prior to transmission.

8. The method of claim 1, wherein the second device plays a melody while decoding the token.

9. The method of claim 1, wherein the second device transmits the token to the payment server in encrypted form.

10. The method of claim 1, wherein a payment application provisioned in the first device authenticates a user prior to transmission of the token.

11. The method of claim 10, wherein authentication of the user is through a personal identification number input by the user.

* * * * *